United States Patent
Tian et al.

(10) Patent No.: US 8,818,333 B2
(45) Date of Patent: Aug. 26, 2014

(54) METHOD FOR HANDLING ROAMING OF MOBILE DEVICE TO RESTRICTED AREA

(75) Inventors: Lu Tian, Plano, TX (US); Yong Zhao, Plano, TX (US)

(73) Assignee: Alcatel Lucent, Boulogne-Billancourt (FR)

( * ) Notice: Subject to any disclaimer, the term of this patent is extended or adjusted under 35 U.S.C. 154(b) by 1476 days.

(21) Appl. No.: 12/155,764

(22) Filed: Jun. 10, 2008

(65) Prior Publication Data

US 2009/0305666 A1   Dec. 10, 2009

(51) Int. Cl.
*H04M 1/66*   (2006.01)

(52) U.S. Cl.
USPC ........ 455/410; 455/411; 455/432.1; 455/433; 455/435.1; 455/456.2; 455/456.1

(58) Field of Classification Search
USPC ............. 455/410, 456.1, 456.3, 456.5, 456.6, 455/432.1, 433, 435.1, 558
See application file for complete search history.

(56) References Cited

U.S. PATENT DOCUMENTS

| | | | |
|---|---|---|---|
| 6,081,723 A * | 6/2000 | Mademann ................ | 455/456.1 |
| 6,119,000 A * | 9/2000 | Stephenson et al. ....... | 455/432.1 |
| 6,968,196 B1 | 11/2005 | Bäck et al. | |
| 7,062,270 B1 | 6/2006 | Dalvie et al. | |
| 2003/0040314 A1* | 2/2003 | Hogan et al. ................. | 455/435 |
| 2003/0092445 A1* | 5/2003 | Timonen et al. ............. | 455/439 |
| 2004/0072578 A1* | 4/2004 | Keutmann et al. ......... | 455/456.1 |
| 2004/0110515 A1* | 6/2004 | Blumberg et al. ......... | 455/456.1 |
| 2005/0233745 A1* | 10/2005 | Noguchi et al. ............ | 455/433 |
| 2010/0228859 A1* | 9/2010 | Backstrom et al. .......... | 709/225 |

FOREIGN PATENT DOCUMENTS

| | | |
|---|---|---|
| EP | 0805609 | 11/1997 |
| EP | 1286560 | 2/2003 |
| FR | 2876533 | 4/2006 |

OTHER PUBLICATIONS

3GPP TS 23.012 V5.2.0 (Sep. 2003), "Location management proceedures" Release 5, pp. 1-43.*
Kruijt N. E. et al: "Location Management Strategies for Cellular Mobile Networks" Electronics and Communication Engineering Journal, Institution of Electrical Engineers, London, GB, vol. 10, No. 2, Apr. 1, 1998, pp. 64-72, XP000782774 ISSN: 0954-0695.
PCT International Search Report and Written Opinion dated Sep. 22, 2009.
International Preliminary Report on Patentability and Written Opinion for international patent application No. PCT/US2009/003376 dated Dec. 23, 2010.
Office Action dated Feb. 1, 2013 for corresponding Chinese Patent Application No. 200980121517.3 with English translation.
Office Action dated Sep. 29, 2013 for corresponding Chinese Patent Application No. 200980121517.3 with English translation.

* cited by examiner

*Primary Examiner* — Khalid Shaheed
(74) *Attorney, Agent, or Firm* — Harness, Dickey & Pierce

(57) ABSTRACT

As a mobile device moves from one location area to another, the mobile device detects the different location identifiers broadcast by the wireless network(s) in those locations areas. The mobile device stores the location identifier for the last location area in which the mobile device was located. By comparing a received location identifier to the stored location identifier, the mobile device determines if the mobile device has entered a new location area. If so, the mobile device sends a location update request. In one embodiment, if the location update request is for a location area to which access by the mobile device is restricted, the network sends a communication to the mobile device that triggers the mobile device to update a location identifier stored at the mobile device to the location identifier for the restricted location area so that the mobile can update the network after entering/selecting a different location area.

18 Claims, 6 Drawing Sheets

METHOD FOR HANDLING ROAMING OF MOBILE DEVICE TO RESTRICTED AREA

BACKGROUND OF THE INVENTION

1. Field

Example embodiments of the present invention relate generally to wireless networks and handling roaming in restricted areas.

2. Description of the Related Art

Wireless networks provide coverage for mobile devices to communicate with wired/wireless communications networks. There are many wireless networks operated by many different wireless service providers. The process of allowing a mobile device subscribing to one wireless provider to communicate on the wireless network of another wireless provider is called roaming.

Wireless networks divide coverage areas into multiple smaller geographical areas. In a wireless network following the GSM protocol, these areas are referred to as location areas. When a mobile device travels from one location area to a new location area, the mobile device notifies the wireless network of the new location area of the mobile device's presence by performing a location update procedure.

During a location update procedure, a mobile device may send a location update request, an identifier associated with the mobile device and an indication of the last location of the mobile device to the wireless network. The wireless network can use this information to contact the home network of the mobile device. Once the wireless network contacts the home network of the wireless device, the wireless network can determine whether or not to provide service to the roaming mobile device. If a wireless network determines the roaming mobile device is located in a restricted location area and decides not to provide service to the roaming mobile device, the wireless network will respond to the location update request sent by the mobile device with a location update rejection message. A restricted location area is a location area to which access by the mobile device is restricted. Based on the method used by the wireless network to respond to the location update request, a mobile device may be prevented from receiving incoming calls even if the mobile device returns to a non-restricted location area.

SUMMARY OF THE INVENTION

The present invention relates to the roaming of a mobile device to and from a restricted area.

As a mobile device moves from one location area to another, the mobile device detects the different location identifiers broadcast by the wireless network(s) in those locations areas. The mobile device stores the location identifier for the last location area in which the mobile device was located. By comparing a received location identifier to the stored location identifier, the mobile device determines if the mobile device has entered a new location area. If so, the mobile device sends a location update request.

In one embodiment, if the location update request is for a location area to which access by the mobile device is restricted, the network sends a communication to the mobile device that triggers the mobile device to update a location identifier stored at the mobile device to the location identifier for the restricted location area. For example, the communication may be an identifier for the mobile device such as a temporary mobile subscriber identifier associated with the restricted location area. After sending this trigger, the network then informs the mobile device that access is restricted.

In one embodiment, the triggering communication is sent after a security procedure that may establish encryption for information received from and sent to the mobile device is initiated. In this manner, even though the location area is restricted, the mobile device will still update the location identifier stored at the mobile device, which may promote more efficient handling the mobile device's roaming if the mobile device leaves the restricted location area.

BRIEF DESCRIPTION OF THE DRAWINGS

Example embodiments of the present invention will become more fully understood from the detailed description provided below and the accompanying drawings, wherein like elements are represented by like reference numerals, which are given by way of illustration only and thus are not limiting of the present invention and wherein.

DETAILED DESCRIPTION OF EXAMPLE EMBODIMENTS

Figure 1:
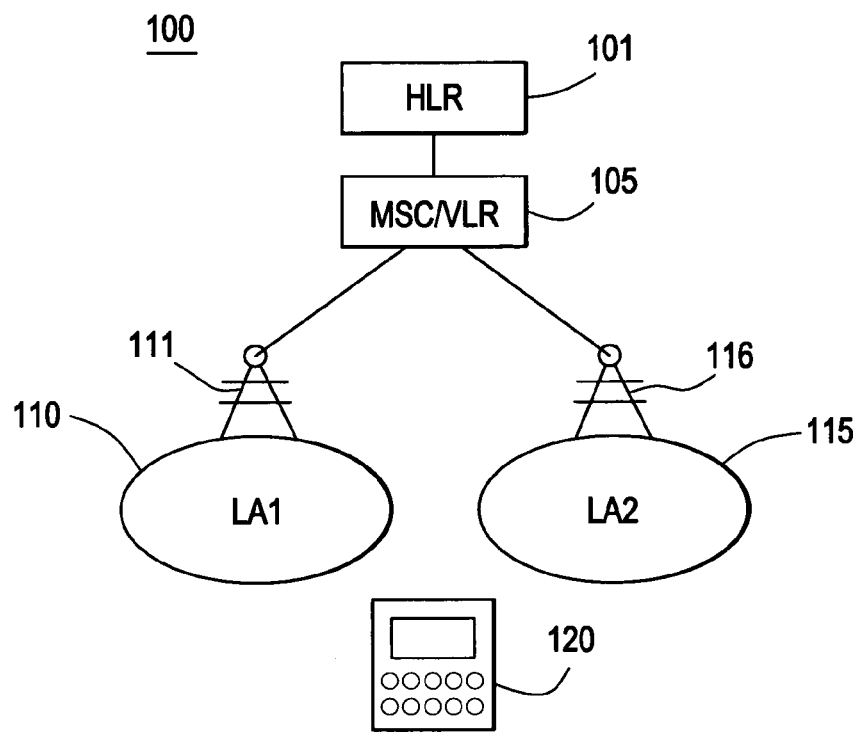
FIG. 1 is a diagram illustrating a wireless system following a GSM protocol.

Various example embodiments of the present invention will now be described more fully with reference to the accompanying drawings in which some example embodiments of the invention are shown. In the drawings, the thicknesses of layers and regions are exaggerated for clarity.

Detailed illustrative embodiments of the present invention are disclosed herein. However, specific structural and functional details disclosed herein are merely representative for purposes of describing example embodiments of the present invention. This invention may, however, may be embodied in many alternate forms and should not be construed as limited to only the embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the invention to the particular forms disclosed, but on the contrary, example embodiments of the invention are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

As used herein, the term "mobile" may be considered synonymous to, and may hereafter be occasionally referred to, as a mobile device, mobile station, mobile user, user equipment (UE), subscriber, user, remote station, access terminal, receiver, etc., and may describe a remote user of wireless resources in a wireless communication network. The term "base station" may be considered synonymous to and/or referred to as a base transceiver station (BTS), NodeB, extended Node B, femto cell, access point, etc. and may describe equipment that provides the radio baseband functions for data and/or voice connectivity between a network and one or more users.

FIG. 1 illustrates a wireless system or network following a GSM protocol 100 according to example embodiments. Though system 100 is described as following GSM protocol, system 100 is not limited to following the GSM protocol. For example, system 100 may follow the UMTS protocol.

Wireless network 100 may include a home location register (HLR) 101 for a mobile device 120, a mobile switching center/visitor location register (MSC/VLR) 105 connected with the HLR101, and first base station 111 and second base station 116 communicating with the MSC/VLR 105. A first location area 110 may be the geographical area covered by base station 111 and a second location area 115 may be the geographical area covered by base station 116. However, it will be appreciated that the first location area 110 may be a geographic area covered by more than one base station, and/or the second location area 10 may be a geographic area covered by more than one base station.

For the purposes of this description, it will be assumed that the first location area 110 is an allowed location area with respect to mobile device 120—meaning mobile device 120 is authorized to roam in first location area 110, and the second location area 115 is a restricted location area with respect to mobile device 120—meaning second location area 115 is location area to which access by the mobile device is restricted. HLR 101 may be the HLR for mobile device 120.

Next, operation of the wireless network illustrated in FIG. 1 will be described with respect to the flowcharts in FIGS. 2-6.

Figure 2:
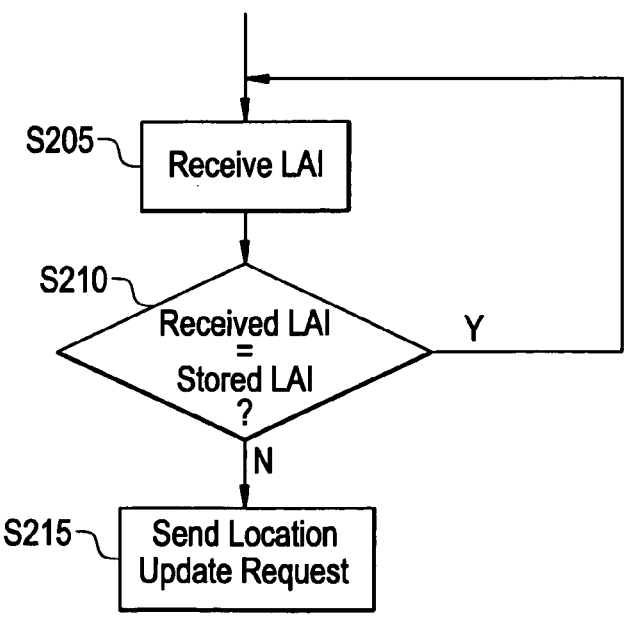
FIG. 2 is a flow chart illustrating a method for a mobile device to initiate an update of location with the wireless network.

FIG. 2 is a flow chart illustrating a method for a mobile device to initiate an update of location with the wireless network.

Referring to FIG. 2, in step S205, the mobile device 120 receives a location area identity (LAI) of the location area in which the mobile device 120 is located. As is well-known, in the GSM standard for example, each location area has an associated identifier called the LAI and base stations associated with a location area transmit the LAI over a broadcast channel.

The mobile device 120 compares the received LAI in the broadcast channel to an LAI stored in the mobile device 120 in step S210. The mobile station 120 may or may not have a stored LAI. The stored LAI is the LAI of the last location area in which the mobile device 120 was located. If the received LAI is the same as the stored LAI, the mobile device 120 determines that the mobile device 120 has not entered a new location area, and processing returns to step S205.

However, if the mobile device 120 determines that the received LAI does not match the stored LAI or the mobile device 120 does not have a stored LAI, then the mobile device 120 determines the mobile device 120 has entered a new location area and sends a location update request in step S215.

The mobile device 120 sends the location update request via a base station (e.g., base station 111 or 116) to the MSC/VLR 105 to request permission to roam in the location area from which the mobile device is sending the location update request. The location update request includes the current temporary mobile subscriber identity (TMSI) assigned to mobile device 120 and information indicating the last location of the mobile device (e.g. the stored LAI) unless the mobile device has no previous location information or TMSI; in which case no previous information is sent in the location update request.

Figure 3:
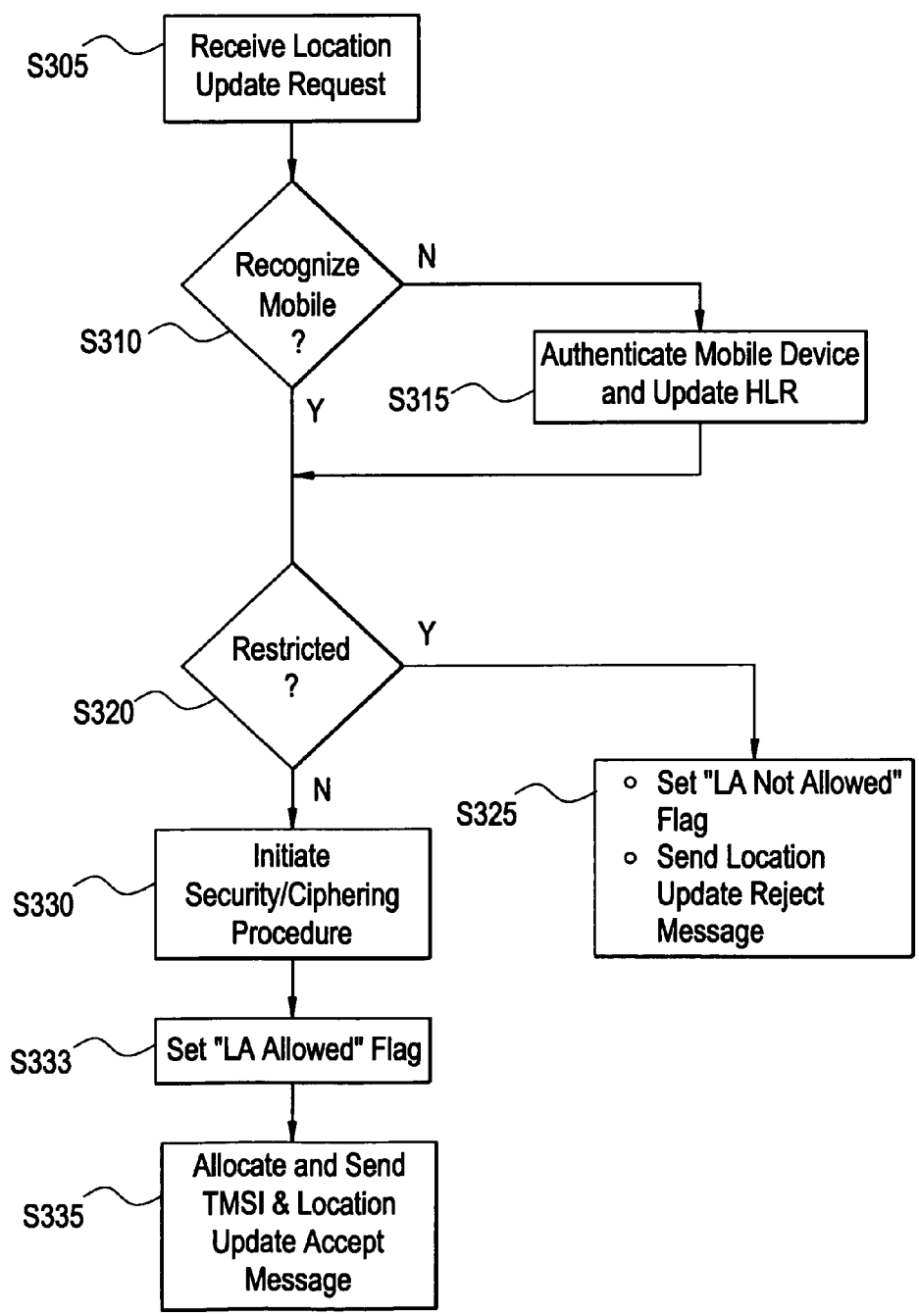
FIG. 3 is a flowchart illustrating a method of processing a location update request at the wireless network.

FIG. 3 is a flowchart illustrating a method of processing a location update request. As shown, in step S305 the MSC/VLR 105 receives the location update request from the mobile device 120. In step S310, the MSC/VLR 105 uses the information in the location update request to determine whether the mobile device 120 is recognized.

If the location information in the location update request includes no previous location information for the mobile device 120, or the location information (e.g., LAI) indicates the mobile device 120 is traveling from a location area associated with another MSC/VLR, the MSC/VLR 105 does not recognize the mobile device 120. If the MSC/VLR 105 does not recognize the mobile device 120, then in step S315 the MSC/VLR 105 performs any well-known authentication process with the HLR 101 and mobile device 120, and obtains from HLR 101 subscriber information relating to the mobile device 120. For example, the authentication procedures specified in the GSM standard may be carried out. Additionally, the HLR 101 updates location information stored in the HLR 101 corresponding to the mobile device 120. After step S315, processing proceeds to step S320.

Returning to step S310, if the location information (e.g., LAI) indicates the mobile device 120 is traveling from another location area also associated with the MSC/VLR 105, then the MSC/VLR 105 recognizes the mobile device 120 and processing proceeds to step S320.

In step S320, the MSC/VLR 105 determines whether or not the mobile device 120 is allowed to roam in the location area from which the mobile device 120 is sending the location update request based on the roaming restrictions. If the MSC/VLR 105 decides the mobile device 120 is attempting to roam in a restricted area, the MSC/VLR 105 sends a location update reject message to the mobile device 120 and stores an "LA not allowed" flag corresponding to mobile device 120 in step S325. Calls terminating to the mobile device 120 and routed from the HLR 101 to the MSC/VLR 105 will not be delivered to mobile device 120 by the MSC/VLR 105 while the "LA not allowed" flag is set. Accordingly, the mobile device 120 will not be able to receive calls while in the restricted location area 115.

As an example, if the mobile device 120 roams into the restricted second location area 115, the MSC/VLR 105 would send the location update reject message.

The MSC/VLR 105 may determine the mobile station is not allowed to roam in a location area and issue a location update reject message for a number of reasons. The cause of the location update rejection may be included in the location update reject message. For example, the MSC/VLR 105 may determine that, based on subscriber information corresponding to mobile device 120, the mobile device 120 is not authorized to roam in the location area. In this case, MSC/VLR 105 may issue a location update reject message with a cause such as the #13—"Roaming not allowed in this location area" cause specified in the GSM protocol. As another example, MSC/VLR 105 may determine that second location area 115 has no available cells with which the mobile device 120 may communicate. In this case, MSC/VLR 105 may issue location update reject message with a cause such as the #15—"No suitable cells in location area" cause specified in the GSM protocol.

Returning to step S320, if the MSC/VLR 105 determines the mobile device 120 is allowed to roam in the location area from which the mobile device 120 is sending the location update request, processing proceeds to step S330.

In step S330, the MSC/VLR 105 initiates a security/ciphering procedure for the mobile device 120. Those of skill in the art will recognize the security/ciphering procedure performed in step S330 may be any known wireless network security procedure that ensures the confidentiality of information sent between the mobile device 120 and the MSC/VLR 105 including the security procedures specified in the UMTS protocol, the ciphering procedures specified in the GSM protocol, etc. For example, the security procedure performed in step S330 may establish encryption for information sent to the mobile device 120 from the MSC/VLR 105 and for information received by the MSC/VLR 105 sent from the mobile device 120.

In step S333, the MSC/VLR 105 sets an LA allowed flag to indicate that the mobile station 120 is allowed to roam in the location area. It will be understood that the setting of this flag may occur before step S330 or concurrently with step S330.

After the security/ciphering procedure, the MSC/VLR 105 will allocate a new TMSI to the mobile device 120 and securely send the TMSI to the mobile device 120 in step S335. The TMSI will be associated at the MSC/VLR 105 with the location area from which the mobile device 120 sent the location update request. The MSC/VLR 105 may send the TMSI in a location update accept message to the mobile device 120 in step S335 or may send the location update accept message separately, after sending the TMSI.

As an example, if the mobile device 120 enters or roams into the allowed location area 110 and sends a location update request to the MSC/VLR 105, the MSC/VLR 105 would send a TMSI and the location update accept message to the mobile device 120.

Next, operation of the mobile device 120 after initiating the location update will be described with respect to the flow charts in FIGS. 4-6. The flow charts of FIGS. 4-6 illustrate processes performed by the mobile device 120 after sending the location update request.

Figure 4:
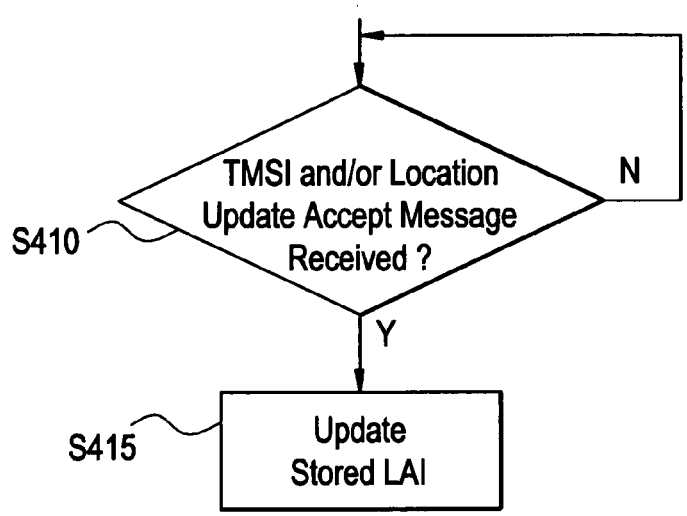
FIGS. 4-6 illustrate flowcharts of processes performed by the mobile device 120 after sending the location update request.

As shown in FIG. 4, the mobile device 120 determines in step S410 if a TMSI and/or location update accept message has been received. If not, processing returns to step S410. If the TMSI and/or the location update accept message has been received, in step S415 the mobile device 120 updates the stored LAI to the LAI received in step S205. Namely, the receipt of the TMSI (and/or of location update accept message), for example, triggers the mobile device 120 to update the stored LAI to the LAI of the location area from which the mobile device 120 sent the location update request.

Figure 5:
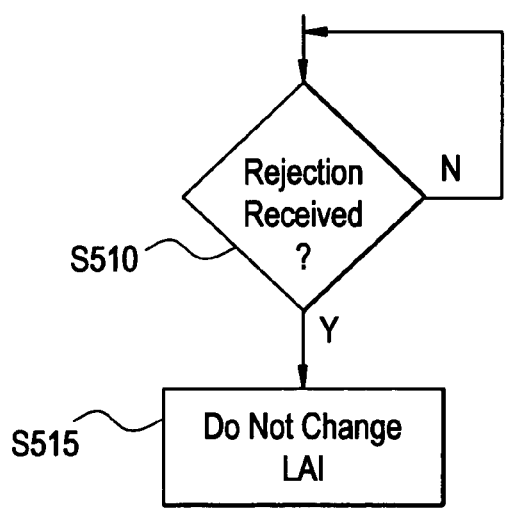

As shown in FIG. 5, the mobile device 120 also determines in step S510 if the location update reject message has been received. If not, processing returns to step S510. However, if the location update reject message has been received, then in step S515 the mobile device 120 does not update the stored LAI. In this circumstance, if the mobile device 120 returns to the location area associated with the stored LAI, the mobile device 120 will not send a location update request. As a result, the MSC/VLR 105 will not be alerted of the new location of the mobile device 120 and the mobile device 120 will not be able to receive calls in the allowed location area.

Figure 6:
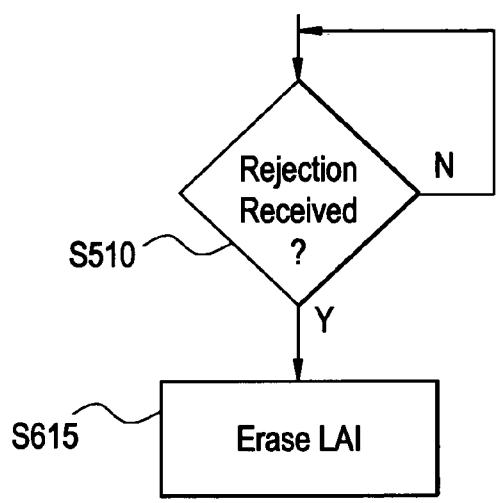

FIG. 6 illustrates an alternative embodiment to that of FIG. 5. In FIG. 6 step S615 replaces step S515. Accordingly, if the location update reject message has been received, then in step S615 the mobile device 120 erases the stored LAI. In this embodiment, if the mobile device 120 returns to the location area associated with the previously stored LAI (prior to erasure), the mobile device 120 will send a location update request. As a result, the MSC/VLR 105 will be alerted to the new location of the mobile device 120. However, as described above, the MSC/VLR 105 will need to perform the authentication and the updating HLR processes of step S315.

Next, operation of the wireless network illustrated in FIG. 1 according to another embodiment will be described with respect to the flowcharts in FIGS. 2, 4-5 and 7.

In this embodiment the mobile device 120 initiates an update of the location of the mobile device with the wireless network as described above with respect to FIG. 2. However, the location update request is processed at the MSC/VLR as shown in FIG. 7.

Figure 7:
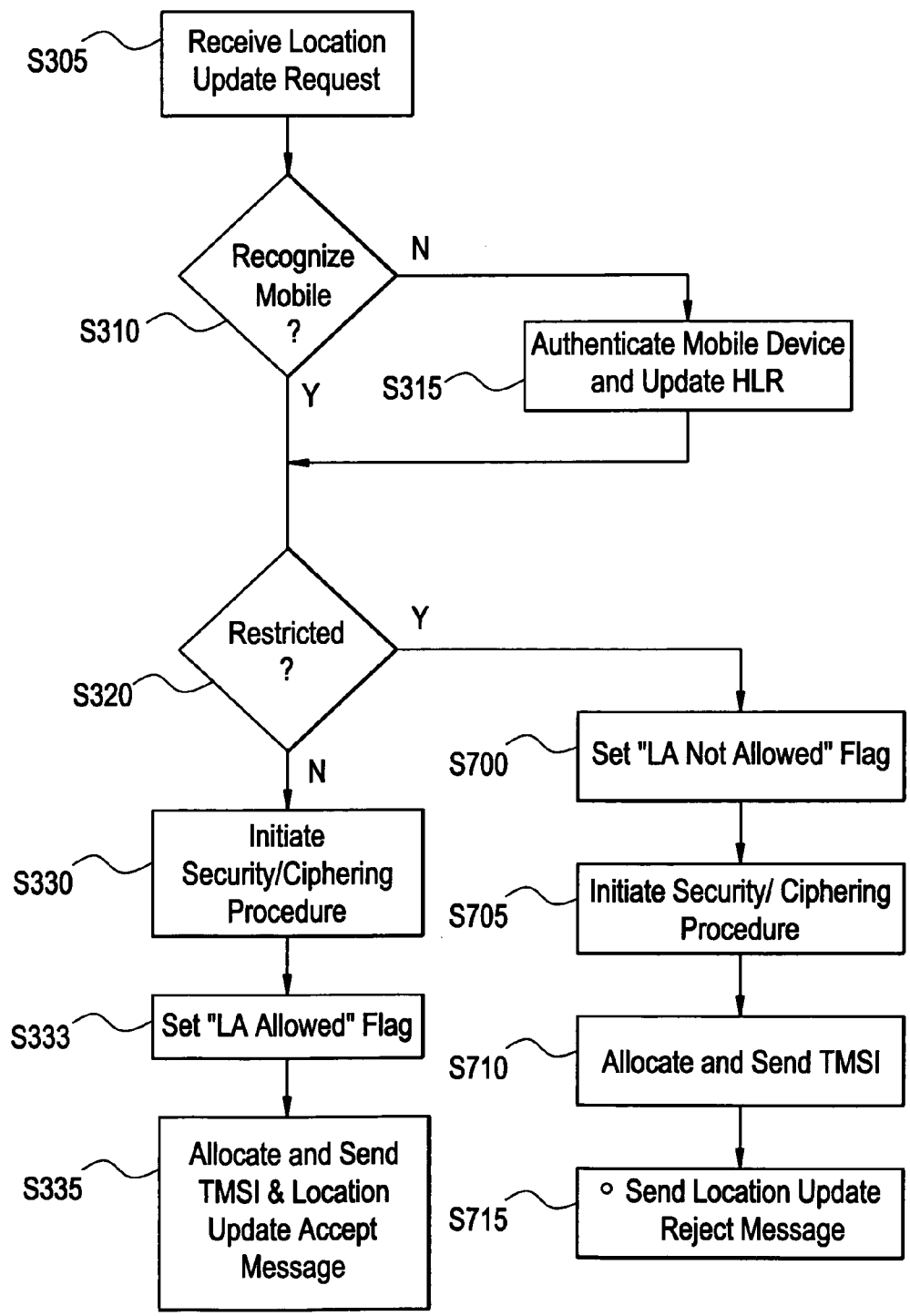
FIG. 7 is a flowchart illustrating a method of processing a location update request according to another embodiment.

The embodiment of processing the location update request illustrated in FIG. 7 is the same as the embodiment illustrated in FIG. 3, except that steps S700-S715 are performed instead of step S325 if the MSC/VLR 105 determines that the mobile device 120 is in a restricted location area.

As shown, if the MSC/VLR 105 determines that the mobile device 120 is in a restricted location area, then in step S700, the MSC/VLR sets the "LA not allowed" flag. Then, in step S705 the MSC/VLR initiates the security procedure for UMTS, the ciphering procedure for GSM, etc. in the same manner as described above with respect to step S330.

Following S705, in step S710 the MSC/VLR 105 still allocates and securely sends a TMSI to the mobile device 120. The allocation may be in the same manner as described above with respect to step S335 except that location update accept message is not sent and the TMSI is associated with the restricted, second location area 115.

After sending the TMSI to the mobile device 120, the MSC/VLR 105 then sends the location update reject message in step S715.

In this embodiment, after sending the location update request, the mobile device 120 performs the processes of FIGS. 4 and 5. Because the MSC/VLR 105 sends a TMSI to the mobile device 120 even if the mobile device 120 is in a restricted location area, the mobile device 120 is triggered in step S410 of FIG. 4 to update the stored LAI to the LAI of the restricted location area in step S415.

The location update reject message will be received after the TMSI such that the mobile device in steps S510 and S515 of FIG. 5 will leave the stored LAI of the restricted location area unchanged. In this embodiment, if the mobile device 120 returns to the location area associated with the previously stored LAI (prior to replacement with the LAI of the restricted location area), the mobile device 120 will send a location update request. As a result, the MSC/VLR 105 will be alerted to the new location of the mobile device 120. Furthermore, as described above, the MSC/VLR 105 will not need to perform the authentication process of step S315. This will result in a more efficient and less time consuming roaming.

Figure 8:
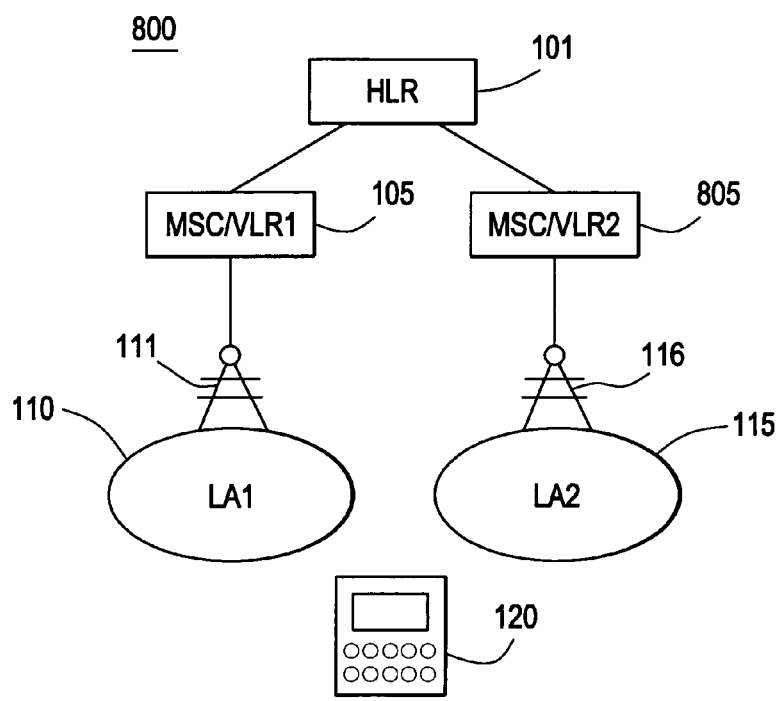
FIG. 8 illustrates a wireless system or network following a GSM protocol according to another example embodiment.

FIG. 8 illustrates a wireless system or network following a GSM protocol according to another example embodiment.

Though system 800 is described as following the GSM protocol, system 800 is not limited to following the GSM protocol. For example, system 800 may follow the UMTS protocol.

Wireless network 800 is the same as wireless network 100 in FIG. 1 except that second base station 116 is communicating with second MSC/VLR 805. Accordingly, first location area 110 and second location area 115 are associated with different MSC/VLRs.

The operation of wireless network 800 is the same as the operation of wireless network 100 with the following exceptions. As described above with respect to FIG. 3, because first location area 110 and second location area 115 are associated with different MSC/VLRs, when mobile 120 leaves first location area 110 and enters second location area 115, the second MSC/VLR 805 does not recognize the mobile unit 120. Accordingly, as described above, in step S315 an authorization process is initiated with HLR 101 and HLR 101 updates the location information stored in HLR 101 corresponding to the mobile device 120. Thus, if mobile device 120 fails to send an update message upon reentering first location area 110, in addition to MSC/VLR 105 being unaware of the presence of mobile device 120 in first location area 110, HLR 101 will store the wrong location information corresponding for the mobile device 120 and the mobile device 120 will not be able to receive calls. By contrast, if the wireless network 800 operates as described above with respect to FIG. 7, while the HLR 101 updates in step S315, the stored LAI will be replaced with the LAI of the restricted location area 115. As such, the mobile device 120 will not fail to send a location update message upon reentering the first location area 110.

The invention being thus described, it will be obvious that the same may be varied in many ways. Such variations are not to be regarded as a departure from the invention, and all such modifications are intended to be included within the scope of the invention.

What is claimed:

1. A method comprising:
   receiving, at a network element from a mobile device, a location update request for a location area to which access by the mobile device is restricted; and
   sending, from the network element to the mobile device, in response to the location update request, a communication that triggers the mobile device to update a location identifier stored at the mobile device to the location identifier for the restricted location area.

2. The method of claim 1, wherein the communication is an identifier for identifying the mobile device.

3. The method of claim 2, wherein the identifier is a temporary mobile subscriber identifier (TMSI) associated with the restricted location area.

4. The method of claim 3 further comprising:
   initiating a security procedure that establishes encryption for information sent to and received from the mobile device before the sending step.

5. The method of claim 4, wherein the security procedure is a UMTS protocol security procedure.

6. The method of claim 4, wherein the security procedure is a GSM protocol ciphering procedure.

7. The method of claim 4, further comprising:
   sending a location update reject message to the mobile device, wherein the TMSI is sent before the location update reject message is sent.

8. The method of claim 7, wherein the location update reject message indicates a cause of the location update reject message is one of the mobile device not being authorized to roam in the restricted location area, and the restricted location area having no available cells with which the mobile device may communicate.

9. A method comprising:
   receiving, at a network element from a mobile device, a location update request for a location area to which access by the mobile device is restricted; and
   assigning and sending the mobile device a temporary mobile subscriber identifier (TMSI) associated with the restricted location area in response to the location update request, the TMSI being assigned and sent by the network element.

10. The method of claim 9, further comprising:
    initiating a security procedure that establishes encryption for information sent to and received from the mobile device before the sending step, wherein the TMSI is sent to the mobile device after the security procedure is initiated.

11. The method of claim 10, further comprising:
    sending a location update reject message to the mobile device, wherein the TMSI is sent before the location update reject message is sent.

12. The method of claim 10, wherein the security procedure is a UMTS protocol security procedure.

13. The method of claim 10, wherein the security procedure is a GSM protocol ciphering procedure.

14. The method of claim 11, wherein the location update reject message indicates a cause of the location update reject message is one of the mobile device not being authorized to roam in the restricted location area, and the restricted location area having no available cells with which the mobile device may communicate.

15. A method, comprising:
    sending, from a mobile device, a location update request for a location area to which access by the mobile device is restricted;
    receiving a communication at the mobile device; and
    updating a location identifier stored at the mobile device to the location identifier for the restricted location area in response to the received communication.

16. The method of claim 15, wherein the communication is an identifier for identifying the mobile device.

17. The method of claim 16, wherein the identifier is a temporary mobile subscriber identifier (TMSI) associated with the restricted location area.

18. The method of claim 15, wherein the location update request is sent to a mobile switching center (MSC) associated with the restricted location area.

* * * * *